United States Patent
Kalantzis et al.

(10) Patent No.: US 9,430,539 B2
(45) Date of Patent: Aug. 30, 2016

(54) UNIVERSAL DATA STORAGE SYSTEM THAT MAINTAINS DATA ACROSS ONE OR MORE SPECIALIZED DATA STORES

(71) Applicant: Netflix, Inc., Los Gatos, CA (US)

(72) Inventors: Christos Kalantzis, San Jose, CA (US); Shyam Singh, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 149 days.

(21) Appl. No.: 14/105,078

(22) Filed: Dec. 12, 2013

(65) Prior Publication Data

US 2015/0169757 A1   Jun. 18, 2015

(51) Int. Cl.
  *G06F 7/00*   (2006.01)
  *G06F 17/30*  (2006.01)

(52) U.S. Cl.
  CPC ... *G06F 17/30569* (2013.01); *G06F 17/30297* (2013.01)

(58) Field of Classification Search
  CPC .............. G06F 17/30297; G06F 17/30557; G06F 17/30569
  See application file for complete search history.

(56) References Cited

U.S. PATENT DOCUMENTS

| | | | |
|---|---|---|---|
| 5,926,810 A * | 7/1999 | Noble et al. | 707/4 |
| 6,243,715 B1 * | 6/2001 | Bogantz et al. | 707/612 |
| 7,917,549 B2 * | 3/2011 | Arazi | G06F 17/30392 707/805 |
| 2001/0029502 A1 * | 10/2001 | Oeda | 707/10 |
| 2002/0059425 A1 * | 5/2002 | Belfiore et al. | 709/226 |
| 2002/0133488 A1 * | 9/2002 | Bellis et al. | 707/6 |
| 2002/0133504 A1 * | 9/2002 | Vlahos et al. | 707/104.1 |
| 2003/0217064 A1 * | 11/2003 | Walters | 707/100 |
| 2004/0186828 A1 * | 9/2004 | Yadav et al. | 707/3 |
| 2007/0185834 A1 * | 8/2007 | Dunn | 707/3 |
| 2008/0059427 A1 * | 3/2008 | Kinder | G06F 9/4435 707/3 |
| 2012/0005241 A1 * | 1/2012 | Ortel | G06F 17/30294 707/803 |

* cited by examiner

*Primary Examiner* — Marc Somers
(74) *Attorney, Agent, or Firm* — Hickman Palermo Becker Bingham LLP

(57) ABSTRACT

In an embodiment, a method comprises receiving an input defining organization of one or more universal data elements; generating a universal schema that defines organization of the one or more universal data elements based on the input; associating the universal schema with a specialized plug-in, wherein the specialized plug-in maps the one or more universal data elements with data elements in one or more specialized databases maintained by a specialized data store; receiving, from a computer, a request to receive data stored in the specialized data store and comprising parameters based on the universal schema; transforming the request using the specialized plug-in to produce a specialized query; sending the specialized query to the specialized data store to execute the specialized query; receiving a specialized result set from the specialized data store; sending, to the computer, a result set based on specialized result set.

26 Claims, 8 Drawing Sheets

UNIVERSAL DATA STORAGE SYSTEM THAT MAINTAINS DATA ACROSS ONE OR MORE SPECIALIZED DATA STORES

FIELD OF THE DISCLOSURE

The present disclosure relates to maintaining data in a distributed database system, and relates more specifically to techniques for maintaining a universal data storage system that manages data in one or more specialized data stores.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different types of databases can organize data differently. For example, one database may store its data in a single file. Another database may be a file server that stores millions of files that drastically vary in size. Another database may use a schema to determine how to save data in a space efficient way. Another database may store its data as a string. Others may vary with respect to maximum table size or minimum latency time. Each database may have advantages that a particular user may find useful for particular problem.

Some users try to anticipate the features that will be most important to them for a given solution, and select a familiar database that they think will best satisfy their problem. However, as a user's system grows, the user may switch to a different database and/or use more than one type of database. To use the features of a different, second database a user may first need to learn the details and complexities of using the second database, and copy data from the first database to the second. However, copying data between databases is time consuming and prone to error. For example, a one database may store each value in the database as a text string in a single file, which is fundamentally different than another database that stores data in a plurality of files and formats based on a proprietary schema and syntax. Accordingly, to copy data stored from one database to another, a user may be required to develop complex proprietary software.

After transferring data to a new database, a user may need to a different set of commands to interface with the new database. For example, if a user copies data from a Structured Query Language ("SQL") database to a non-SQL-based database, then then the user may need to learn a completely new set of commands to interface with the new database. Even among databases that are SQL-based databases, schemas and SQL syntax can be different. Furthermore, the result returned by the second database may be in a different format.

SUMMARY

The appended claims may serve as a summary of the invention.

Figure 1:
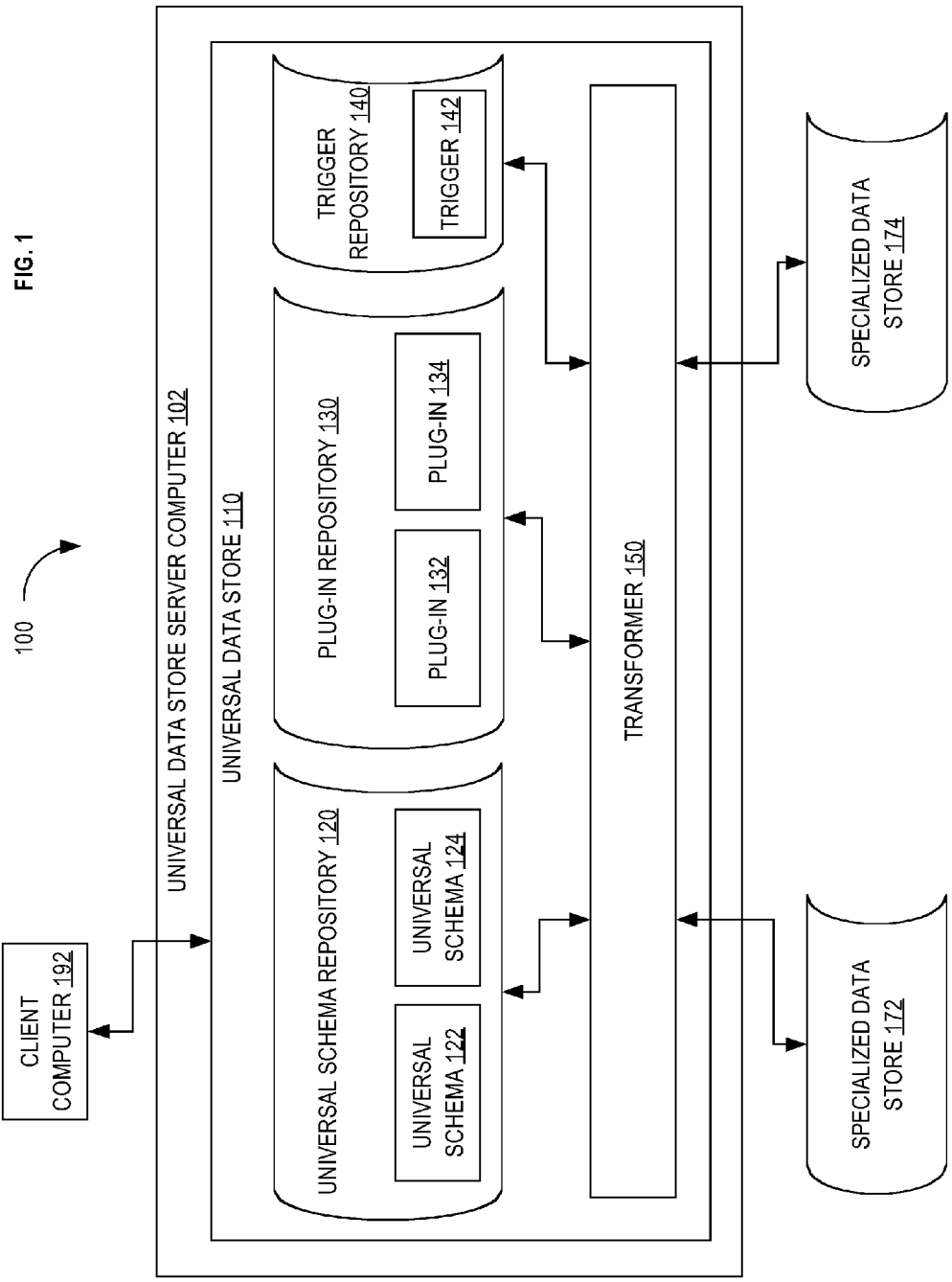
FIG. 1 illustrates a system comprising a universal data store system, in an example embodiment.

While each of the drawing figures illustrates a particular embodiment for purposes of illustrating a clear example, other embodiments may omit, add to, reorder, and/or modify any of the elements shown in the drawing figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 Terms
  2.0 General Overview
  3.0 Network Topology
    3.1 Universal Data Store
    3.2 Universal Schema Repository
    3.3 Plug-in Repository
    3.4 Trigger Repository
    3.5 Transformer
  4.0 Process Overview
    4.1 Performing CRUD Operations on a Universal Database in a Universal Data Store
      4.1.1 Creating, Updating, and/or Deleting a Universal Database
      4.1.2 Creating, Reading, Updating, and/or Deleting data in a Universal Database
    4.2 Performing Additional Transformations on Universal Results
    4.3 Performing Customized Triggers on Universal Results
    4.4 Copying Data from One Data Store to Another
  5.0 An Example Specialized Database and Universal Schema
  6.0 Additional Features and Benefits
  7.0 Implementation Mechanisms—Hardware Overview
  8.0 Other Aspects of Disclosure

1.0 Terms

In certain embodiments:

A "computer" may be one or more physical computers, virtual computers, and/or computing devices. As an example, a computer may be one or more server computers, virtual machine instances or virtual machine computing elements such as virtual processors, storage and memory, data centers, storage devices, desktop computers, laptop computers, mobile devices, and/or any other special-purpose computing devices. Any reference to "a computer" herein may mean one or more computers, unless expressly stated otherwise.

A "database" may be an organized collection of data defined by one or more schemas. An example of a database includes a flat file database, a file system, and/or a relational database.

A "database schema" may define how a database is structured and the data structures and/or data elements in a database. A database schema may define tables, fields, relationships, views, indexes, packages, procedures, functions, queues, triggers, data types, sequences, materialized views, synonyms, database links, directories, credentials for authorizing users to perform one or more operations, and/or any other data that defines a database.

A "type of database" may be a database that has a particular interface, data structure, file structure, storage system, schema format, protocol, and/or any other particular technical feature or property. As an example, two databases may be the same type of databases if both databases have the same interface, data structure, file structure, storage system, schema format, protocol, and/or any other uniform technical aspect. Two databases may be different types of databases if the databases differ based on interface, data structure, file structure, schema format, protocol, and/or any other particular technical feature or property. Thus, a relational database may be a different type of database than a file system; a SQL database may be a different type of database than a non-SQL database; and a SQL database that that stores data in a single flat file may be a different type of database than a SQL database that stores data in multiple files.

A "data store" may be a data repository that maintains one or more databases. As an example, a data store may include an interface to maintain one or more databases. Additionally, a data store may comprise one or more processes executed on a computer. As an example, a data store may include one or more processes that receive requests, process the requests, and store data in and/or return data from one or more databases the data store maintains.

A "specialized data store" means a data store that maintains data in one or more databases, each of which is the same type of database. As an example, a SQL data store may be a specialized data store if each of the databases maintained by the SQL data store is the same type of SQL database.

A "specialized database" may be a database maintained by a specialized data store.

A "universal data store" may be a data store that manages or maintains one or more databases maintained, at least in part, by a plurality of specialized data stores of the same or different types. As an example, a universal data store may maintain two databases: the data in the first database may be stored in a first specialized database, maintained by a first specialized database; the data in the second database may be stored in a second specialized database, maintained by a second specialized database.

A "universal database" may be a database managed or maintained by a universal data store, which stores data in one or more specialized databases. As an example, a universal database may include two tables. The data in the first table may be maintained by a specialized database in a first specialized data store. The data in the second table may be maintained by a specialized database in a second specialized data store.

"Getting data from a universal database" may mean getting data from the one or more specialized databases that include the data for the universal database.

"Storing data in a universal database" may mean storing data in the one or more specialized databases that include the data for the universal database.

A "universal schema" may be a database schema for a universal database. A universal schema may define the data structures in a universal database. A universal schema may specify which data in a universal database is stored and/or maintained in which specialized database(s) and/or which specialized data store(s). A universal schema may specify the type of each specialized database and/or data store that maintains data in a universal database. Additionally or alternatively, as discussed in detail below, a universal schema may specify one or more plug-ins and/or one or more triggers to use.

A "request based on a universal schema" or a "universal request" may be a request received by a request that specifies data to be stored and/or retrieved based on the data structures defined in the universal schema. For purposes of illustrating a clear example, assume that a universal schema identifies a table with a first column called "Column_1" and a second column called "Column_2." A request based on the universal schema may request the data in "Column_1" for each record with a particular value stored in Column_2.

A "result based on a universal schema" or a "universal result" may be a result that identifies data based on a universal schema. For purposes of illustrating a clear example, assume that a universal schema identifies a table named "Table 1", with a first column named "Column_1" and a second column name "Column_2." A result that is based on the universal schema may include data that may be identified as either in belonging to "Table 1" and specifically, "Column_1" or "Column_2".

A "specialized query" may be one or more operations to be executed by a specialized data store. A specialized query may be generated by a universal data store to store or retrieve data in a specialized database.

A "specialized result" may be a result that is generated by a specialized data store and/or specialized database.

A "plug-in" may be a set of one or more configuration files and/or operations that define rules and/or instructions for a universal data store to transform universal requests to a specialized query for a specialized data store. Additionally, a plug-in may define how specialized results from a specialized data store should be transformed into a universal result. As an example, a plug-in may be one or more scripts and/or one or more executable files that implement a protocol. The protocol may include a method for each type of universal request, such as a request to create, read, update, and/or delete a universal database, a table in a universal database, and/or data in a universal database, and transform. Accordingly, each method in the protocol may transform a type of universal request into a specialized query for a specialized data store. Additionally or alternatively, the protocol includes a method for transforming data retrieved from a specialized data store into a universal result. Additionally or alternatively, a protocol may include one or more configuration files that define how a universal schema maps to a database schema for a specialized database in a specialized data store. As an example, a plug-in may map universal databases, tables, columns, and entries to SQL-based databases, tables, columns, and entries. As another example, a plug-in may map universal databases, tables, columns, and entries to a file system, directory, sub-directories, file names, and data stored in a files.

A "trigger" may be one or more instructions, operations, and/or commands that are performed in response to one or more conditions. For example, a trigger may include a condition that is satisfied if a universal request performs a particular operation, or includes a particular parameter. Additionally or alternatively, a trigger may include a condition that is satisfied if a universal request is based on a particular universal schema. Additionally or alternatively, a trigger may include a condition that is satisfied in a universal result includes particular data or quantity of data. As an example, if a universal result includes an image, then a trigger that converts the image to a particular format may be executed. As another example, if the size of the universal result is greater than a particular threshold, then a trigger that compresses the universal result may be executed.

A "built-in trigger" may be a trigger that is defined by a universal data store and is available to for any universal database user to use. For example, a universal data store may include a built-in trigger that copies data to a second specialized database in response to receiving a request that causes data to be stored in a first specialized database.

A "custom trigger" may be a trigger that is created by a user and is uploaded to a universal data store through a client computer. For example, a user may upload a custom trigger to a universal data store that causes results to be formatted in a particular format in response to a request for data from a universal database that the user manages and that includes a particular parameter.

2.0 General Overview

In an embodiment, a method comprises receiving a first input defining organization of one or more universal data elements; generating a first universal schema that defines organization of the one or more universal data elements based on the first input; associating the first universal schema with a first specialized plug-in, wherein the first specialized plug-in maps the one or more universal data elements with data elements in one or more specialized databases maintained by a first specialized data store; receiving, from a first computer, a first request to receive data stored in the first specialized data store and comprising parameters based on the first universal schema; transforming the first request using the first specialized plug-in associated with the first universal schema to produce a specialized query; sending the specialized query to the first specialized data store to execute the specialized query; receiving a first specialized result set from the first specialized data store; sending, to the first computer, a result set based on specialized result set. In an embodiment, the method comprises receiving the first request from the first computer in an HTTP request; sending the result set to the first computer using an HTTP response. In an embodiment, the method comprises transforming the first specialized result set to produce the result set using the first specialized plug-in, wherein the result set is formatted based on the first universal schema.

In an embodiment, the method comprises associating a first universal schema with a second specialized plug-in; transforming the first request using the first specialized plug-in associated with the first universal schema to produce a first specialized query to retrieve a first set of results from the first specialized data store; wherein the first specialized query comprises one or more instructions that are compatible with the first specialized data store; transforming the first request using the second specialized plug-in associated with the first universal schema to produce a second specialized query to retrieve a second set of results from a second specialized data store; wherein the second specialized query comprises one or more instructions that are compatible with the second specialized data store; wherein the second specialized query is different than the first specialized query; receiving the first specialized result set from the first specialized data store based on the first specialized query; receiving a second specialized result set from the second specialized data store based on the second specialized query; transforming the first specialized result set to a first universal result set, wherein the first universal result set is based on the first universal schema; transforming the second specialized result set to a second universal result set, wherein the second universal result set is based on the first universal schema; joining the first universal result set and the second universal result set to produce the result set, which is a universal result set that is based on the first universal schema.

In an embodiment, a method comprises receiving an input defining organization of one or more universal data elements; generating a universal schema that defines organization of the one or more universal data elements based on the input; associating the universal schema with a first specialized plug-in, wherein the first specialized plug-in defines how the one or more universal data elements are organized in a first specialized data store; receiving a command to copy data in the first specialized data store to a second specialized data store; associating the universal schema with a second specialized plug-in, wherein the second specialized plug-in defines organization of the one or more universal data elements in the second specialized data store; generating a first request to receive a set of data from the first specialized data store; transforming the first request using the first specialized plug-in to produce a first specialized query; sending the first specialized query to the first specialized data store to execute the first specialized query; receiving a specialized result set from the first specialized data store; transforming the specialized result set using the first specialized plug-in to produce a universal result set, wherein the universal result set is formatted based on the universal schema; generating a second specialized query, using the second specialized plug-in, to store the universal result set in the second specialized data store; sending the second specialized query to the second specialized data store.

3.0 Network Topology

FIG. 1 illustrates a system comprising a universal data store system, in an example embodiment. In FIG. 1, system 100 includes universal data store server computer 102, specialized data store 172, specialized data store 174, and client computer 192 distributed across a plurality of interconnected networks. While each of the components listed above are illustrated as if running on a separate, remote computer from each other, one or more of the components listed above may part of and/or executing on the same computer.

3.1 Universal Data Store

Universal data store 110 is a universal data store that is executed on universal data store server computer 102. Universal data store 110 is communicatively coupled to client computer 192, specialized data store 172, and specialized data store 174, through universal data store server computer 102.

Universal data store 110 may maintain one or more universal databases according to the methods discussed herein. For example, in FIG. 1, universal data store computer 102 is a universal data store that maintains two universal databases, defined by two universal schemas: universal schema 122 and universal schema 124. The data in the universal databases are maintained across one or more specialized data stores: specialized data store 172 and specialized data store 174.

In FIG. 1, universal data store 110 and universal schema repository 120, plug-in repository 130, trigger repository 140, and transformer 150 are illustrated on universal data store server computer 102. However, universal data store 110 and each of its components may be distributed across more than one computer and/or one or more remote networks. In an embodiment, each of the functional units of universal data store 110 may be implemented using any of the techniques described herein in connection with FIG. 8; for example, the universal data store may comprise a general-purpose computer configured with one or more stored programs which when executed cause performing the functions described herein for the universal data store, or a special-purpose computer with digital logic that is configured to execute the functions, or digital logic that is used in other computing devices.

3.2 Universal Schema Repository

A universal schema repository may store one or more universal schemas. For example, in FIG. 1, universal schema repository 120 includes universal schema 122 and universal schema 124. Universal schema 122 defines a first universal database maintained by universal data store 110. Universal schema 124 defines a second universal database maintained by universal data store 110.

3.3 Plug-In Repository

A plug-in repository may store one or more plug-ins. For example, in FIG. 1, plug-in repository 130 includes plug-in 132 and plug-in 134. Plug-in 132 may define one or more rules and/or instructions to transform a universal request into a specialized query that may be executed by specialized data store 172. Plug-in 132 may define one or more rules and/or instructions to transform specialized results received from specialized data store 172 to a universal result based on a universal schema. Additionally, plug-in 132 may define the type(s) of specialized database(s) that plug-in 132 may be useful for.

3.4 Trigger Repository

A trigger repository may store one or more triggers. For example, trigger repository 140 includes trigger 142. Trigger 142 may be either a built-in trigger or a custom trigger.

3.5 Transformer

As discussed herein, transformer 150 may transform universal requests into specialized queries, and/or specialized results into universal results, using one or more plug-ins from plug-in repository 130. Additionally or alternatively, and as discussed herein, transformer 150 may execute one or more triggers in trigger repository 140, if conditions for the one or more triggers are satisfied.

In an embodiment, transformer 150 may associate a universal schema in universal schema repository 120 with a plug-in in plug-in repository 130. For purposes of illustrating a clear example, assume the following facts:

Universal schema 122 defines a universal database;
Universal schema 122 indicates that the data in the universal database is stored in a specialized database maintained by specialized data store 172;
Plug-in 132 specifies that it is a plug-in for the same type of databases that specialized data store 172 maintains.

Accordingly, transformer 150 may update universal schema 122 to indicate that transformer 150 should use plug-in 132 for universal requests or specialized results related to the universal database that universal schema 122 defines. Additionally or alternatively, transformer 150 stores a mapping between a universal schema and one or more plug-ins. Additionally or alternatively, transformer 150 dynamically determines which plug-in to use for each request and/or each result.

4.0 Process Overview

A universal data store may receive and respond to universal requests from one or more client computers over a protocol such as Hypertext Transfer Protocol ("HTTP") or any subset of HTTP, such as Hypertext Transfer Protocol Secure ("HTTPS"). For example, a universal data store may receive create, read, update, and/or delete ("CRUD") requests to create, read, update, and/or delete one or more universal databases and/or data in the one or more universal databases through a web service, such as a Representational State Transfer ("REST") application programming interface ("API") or Simple Object Access Protocol ("SOAP") API. Additionally, a universal data store may perform one or more complex operations such as joins or triggers. Additionally or alternatively, a universal data store may copy data maintained in a first specialized data store to a second specialized data store.

4.1 Performing Crud Operations on a Universal Data Store

In an embodiment, a REST API is based, at least in part, on the HTTP operations "POST," "GET," "PUT," and "DELETE." Each of the four operations may be associated with a CRUD request: Create may be associated with POST, Read may be associated with GET, Update may be associated with PUT, and Delete may be associated with DELETE. Accordingly, in an embodiment, a universal data store may perform one or more CRUD operations and/or methods in response to a universal request with a Uniform Resource Locator ("URL") and an HTTP operation.

4.1.1 Creating, Updating, and/or Deleting a Universal Database

Figure 2:
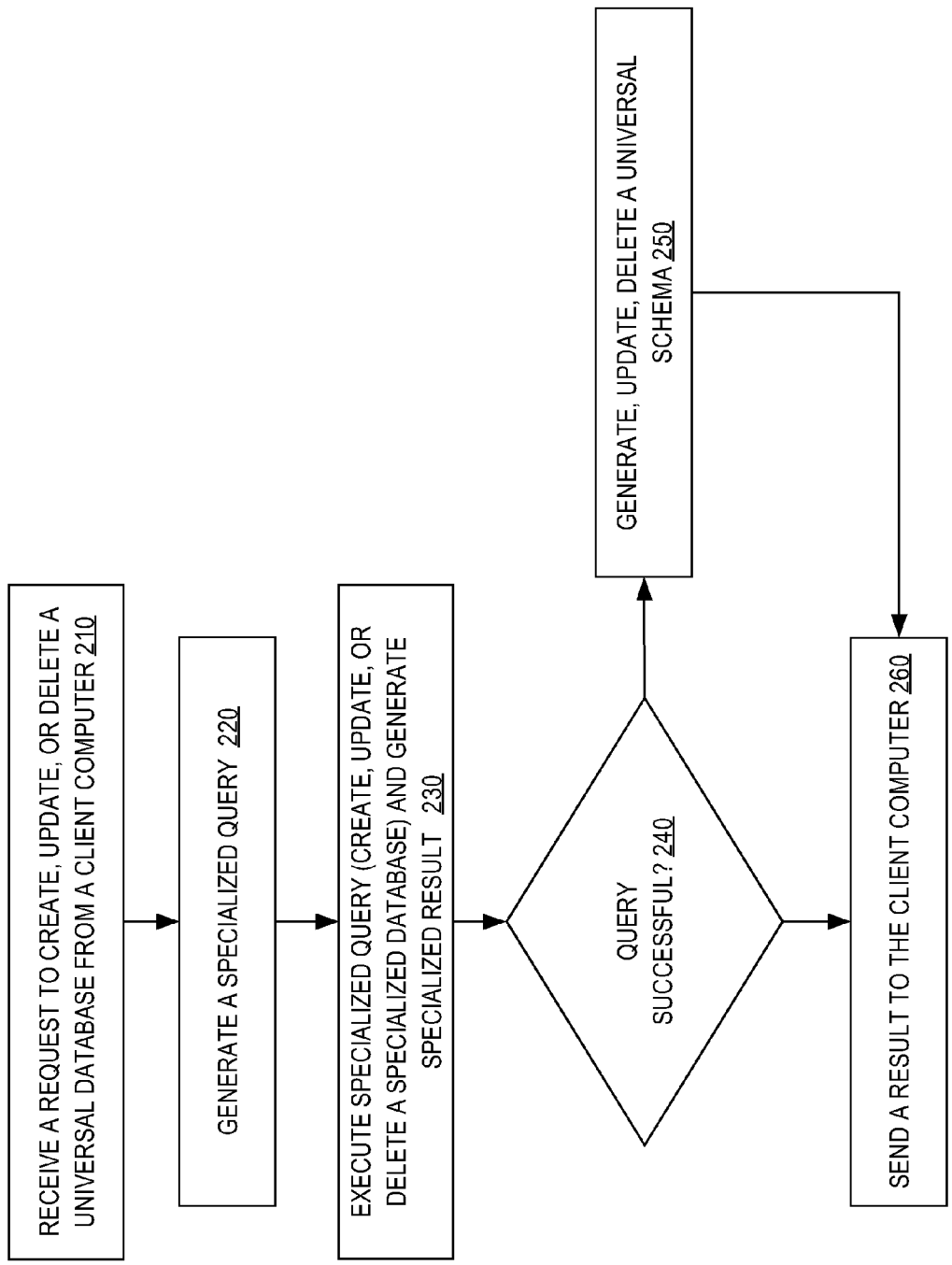
FIG. 2 illustrates a process for creating, updating, and/or deleting a universal database, in an example embodiment.

A universal data store may receive a request to create, update, and/or delete a universal database. FIG. 2 illustrates a process for creating, updating, and/or deleting a universal database, in an example embodiment. For purposes of illustrating a clear example, FIG. 2 may be described with reference to FIG. 1, but using the particular arrangement illustrated in FIG. 1 is not required in other embodiments.

In step 210, a universal data store receives a request to create, update, or delete a universal database from a client computer. For example, universal data store 110 may receive a POST request over HTTP from a user, through client computer 192. The request may define a new universal database named "Shop Customers" and a table named "Customers" with two columns, named "Customer Name" and "Customer Number." The request may indicate the values in the column Customer Name are strings and the values in the column Customer Number are integers. The request may also specify the specialized data store that should maintain the data in the universal database: "172". The request may identify the specialized data store may name, "172", by the Internet Protocol ("IP") address of specialized data store 172, and/or the type of databases maintained by specialized data store 172.

In step 220, the universal data store generates a specialized query. For example, universal data store 110 forwards the request to transformer 150. For purposes of illustrating a clear example, assume that plug-in 132 indicates that it is a plug-in for the same type of databases that specialized data store 172 maintains. Accordingly, transformer 150 may determine to use plug-in 132, and may call a method in plug-in 132 passing the request received in step 210 as a parameter. For purposes of illustrating a clear example, assume that specialized data store 172 maintains a SQL-based database. Accordingly, transformer 150 may use plug-in 132 to transform the request into a specialized query that includes one or more SQL-based queries to generate a specialized database in specialized data store 172 with a table and two columns as defined in the request.

Among other things, plug-in 132 may mangle the names of the objects in the request. For purposes of illustrating a clear example, assume the request to create the universal database includes a user identifier, "123". Instead of returning a specialized query that creates a database with the name "Store Customers," plug-in 132 may return a specialized query that creates a database with the name "Store Customers-123." Furthermore, assume that the specialized database requires that each character in an object name is a lower case character. Accordingly, instead of returning a specialized query that creates a database with the name "Store Customers-123," plug-in 132 may return a specialized query that creates a database with the name "s_tore c_ustomers-123."

In step 230, the universal data store executes the specialized query (creates, updates, or deletes a specialized database) and generates a specialized result. For example, transformer 150 may send the specialized query to specialized data store 172 to be executed. Accordingly, specialized data store 172 generates the specialized database and a table according to the specialized query.

In step 240, the universal data store determines whether the specialized query was successfully executed. For example, specialized data store 172 sends a specialized result to transformer 150 that indicates whether the specialized query was successfully executed. Transformer 150 uses plug-in 132 to evaluate the specialized result. If transformer 150, using the plug-in 132, determines that the specialized query was successfully executed, then control proceeds to step 250. Otherwise, control proceeds to step 260.

In step 250, the universal data store generates, updates, or deletes a universal schema. For example, universal data store 110 may create universal schema 122. Universal schema 122 may define a universal database named "Store Customers", with a table named "Customers", with two columns named "Customer Name" and "Customer Number." Universal schema 122 may define the types of values in each column. For example universal schema may define the values in the column "Customer Name" as character strings and the values in the column "Customer Number" integers. Universal schema 122 may include the IP address or other connection information for specialized data store 172. Universal schema 122 may define the type of databases maintained by the specialized data store 172. Universal schema 122 may include a reference to use plug-in 132.

In step 260, the universal data store sends a result to the client computer. For example, if transformer 150, through the plug-in 132, determines that the query was executed successfully, then universal data store 110 may return a successful response to client computer 192 according an HTTP protocol, such as success code 201. Otherwise, universal data store 110 may return a failed response to client computer 192 according to an HTTP protocol, such as error code 500.

Steps similar to step 210 through step 260 may be used to update or delete a universal database. For example, universal data store 110 may receive a PUT request, with the user identifier "123," to update the name of the first column, "Customer Name," to "Customer Company Name." Additionally or alternatively, universal data store 110 may receive a DELETE request with the user identifier "123" to delete the table named "Customers." In either example, universal data store 110 may use transformer 150 to transform the request into a query for specialized data store 172, using plug-in 132, and send the query to specialized data store 172. Specialized data store 172 may return a result to transformer 150. Transformer 150 may use plug-in 132 to evaluate the results of the query. If the query results indicate the query was successful, universal data store 110 may update or delete universal schema 122 accordingly and return a successful response, such as code 201, to client computer 192. Otherwise, universal data store 110 may return failed response, such as code 500, to client computer 192.

4.1.2 Creating, Reading, Updating, and/or Deleting Data in a Universal Database

Figure 3:
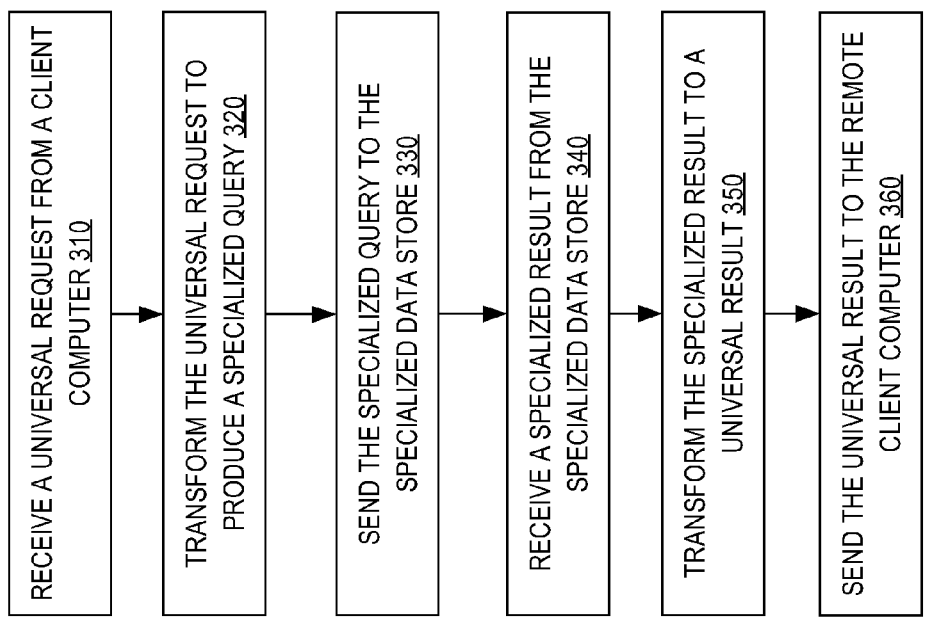
FIG. 3 illustrates a process for receiving a request to create, read, update, or delete data from a universal database, in an example embodiment.

A universal data store may receive universal request to create, read, update, and/or delete data in a universal database. FIG. 3 illustrates a process for receiving a request to create, read, update, or delete data from a universal database, in an example embodiment. For purposes of illustrating a clear example, FIG. 3 may be described with reference to FIG. 1, but using the particular arrangement illustrated in FIG. 1 is not required in other embodiments.

In step 310, a universal data store receives a universal request from a client computer. For purposes of illustrating a clear example, assume the following facts:

Universal data store 110 includes universal schema 122, which describes a universal database.

Universal schema 122 indicates that the universal database is named "Shop Customers" and includes a table named "Customers" with a column named "Customer Name".

Universal schema 122 specifies that the data for the universal database is stored in a database maintained by specialized data store 172.

Universal schema 122 schema indicates that transformer 150 should use plug-in 132, for universal requests referencing the universal database name "Shop Customers".

Specialized data store 172 is a SQL-based data store that includes a specialized database named "s_hop c_ustomers" that corresponds to the universal database described by universal schema 122 named "Shop Customers".

The specialized database named "s_hop c_ustomers" includes a table called "c_ustomers" that corresponds to the table "Customers" in the universal database.

The table named "c_ustomers" includes a column named "c_ustomer n_name," which corresponds to the column named "Customer Name" in the universal table named "Customers".

The table named "c_ustomers" includes two records with different each with a different name: "Bob" and "Jim".

Accordingly, universal data store 110 may receive a GET request over HTTP from a user using client computer 192 for the names of the clients in the table named "Customers" stored in the universal database named "Shop Customers". Additionally or alternatively, the request may include an identifier that identifies universal schema 122.

In step 320, the universal data store transforms the universal request to produce a specialized query. For example, transformer 150 may determine to use plug-in 132 based on the reference to plug-in 132 in universal schema 122. Additionally or alternatively, transformer 150 may determine to use plug-in 132 based on a method similar to the methods described in step 220 of FIG. 2. Accordingly, transformer 150 may call a method in plug-in 132 passing the request received in step 310 as a parameter. Plug-in 132 may return a specialized query that includes one or more SQL-based queries to return the data requested.

As discussed above with regard to FIG. 2, plug-in 132 may mangle the names of the objects in the request. For example, the specialized query may include the specialized data base name: "s_hop c_ustomers."

In step 330, the universal data store sends the specialized query to the specialized data store. For example, transformer 150 may send the specialized query to specialized data store 172.

In step 340, the universal data store receives a specialized result from the specialized data store. For example, specialized data store 172 executes the specialized query sent in step 330, and sends a specialized result to transformer 150. For purposes of illustrating a clear example, assume the specialized result includes the names "Bob" and "Jim." The specialized result may be based on a database schema stored and maintained in the specialized database and/or specialized data store 172. Accordingly, the specialized result may include the specialized database name, table name, and column name: "s_hop c_ustomers", "c_ustomers", and "c_ustomer n_name".

In step 350, the transformer transforms the specialized result into a universal result. Accordingly, transformer 150 uses plug-in 132 to transform the specialized result into a universal result based on universal schema 122. Additionally the universal result may be encoded into format that is capable of communication over HTTP and capable of interpretation by a browser, such as JavaScript Object Notation ("JSON"): "{'Shop Customers': {'Customers': 'Customer Name': ['Bob', 'Jim']}}". However, the universal result need not be in JSON format. The universal result may be in any format, such as Extensible Markup Language, and/or any other standardized or proprietary format.

In step 360, the universal data store sends the universal result to the client computer. For example, universal data store 110 may send the universal result produced in step 350 to remote client computer 192 over HTTP. However, universal data store 110 may send the universal result over one or more other protocols, such as HTTPS, Secure Shell, or any other standard or proprietary protocol.

Steps similar to step 310 through step 360 may be used to create, update, and/or delete data from a universal database. For example, universal data store 110 may receive a POST request to create or insert data in a universal database. The request may include parameters that correspond to data in universal schema 122:
the name of the universal database, "Shop Customers",
the name of a table to perform the insert on, "Customers",
the column to insert the data into, "Customer Name", and
the data to insert, "Lacy".

Also for example, universal data store 110 may receive a PUT request to update data in a universal database. The request may include parameters that correspond to data in universal schema 122:
the name of the universal database, "Shop Customers",
the name of a table to perform the insert on, "Customers",
the column to search and update, "Customer Name",
the value to match, "Lacy", and
the name to update each match to, "Sally".

Also for example, universal data store 110 may receive a DELETE request to remove or delete data from a universal database. The request may include parameters that correspond to data in universal schema 122:

the name of the universal database, "Shop Customers",
the name of a table to perform the insert on, "Customers",
the column to search and update, "Customer Name", and
the value to match, "Lacy".

4.2 Performing Additional Transformations on Universal Results

A universal data store may perform additional transformations on universal results before sending the universal results to a client computer. For example, a universal data store may transform the strings in a universal format from ASCII encoded characters to 16-bit Unicode Transformation Format encoded characters. Also for example, a client computer may request the universal data store join results from a first universal result and a second universal result. The joined first and second universal result may be a product of one or more universal requests.

Figure 4:
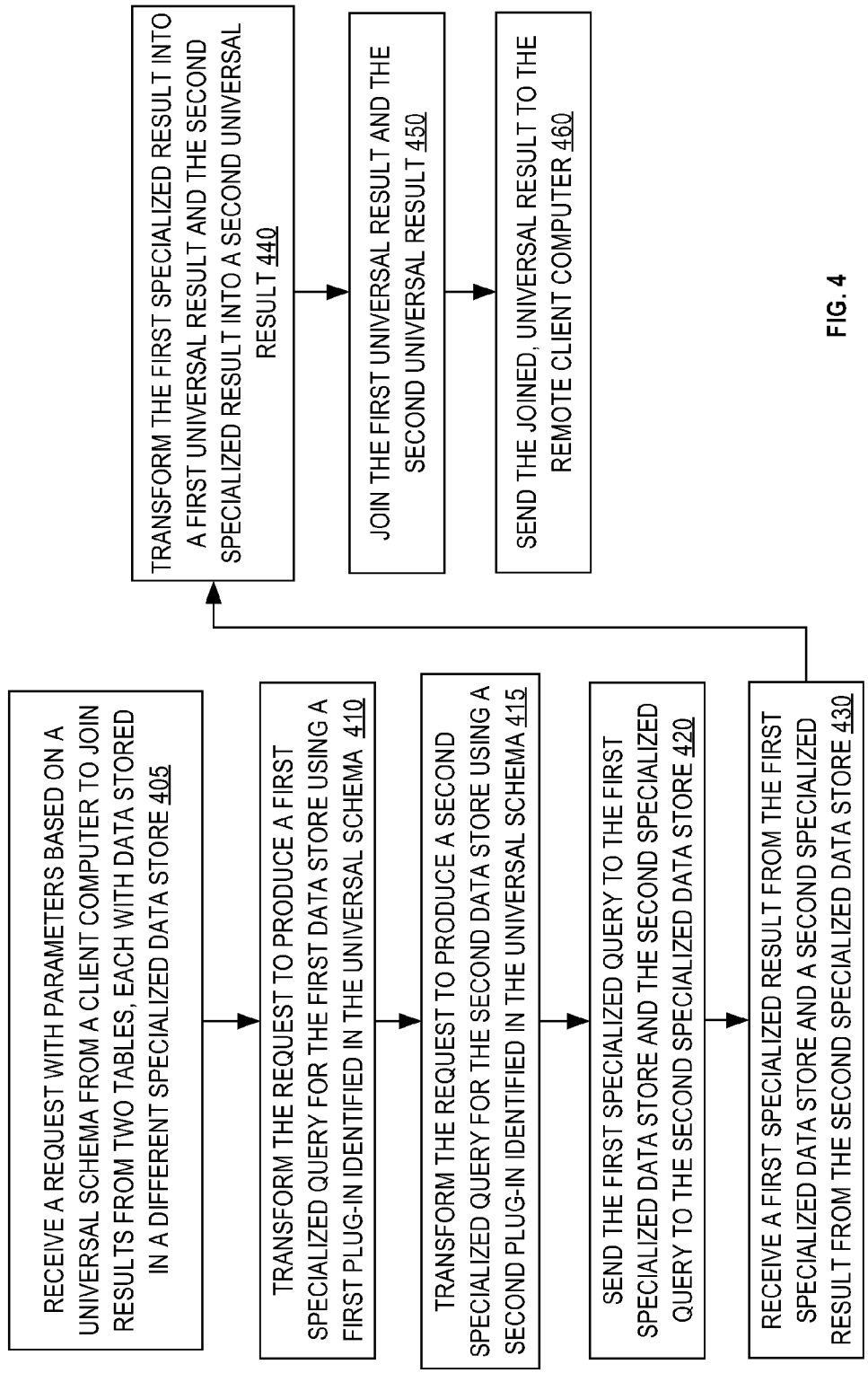
FIG. 4 illustrates a process performing a join on two universal result sets from two tables in a universal database that spans more than one specialized data store, in an example embodiment.

FIG. 4 illustrates a process performing a join on two universal result sets from two tables in a universal database that spans more than one specialized data store, in an example embodiment. For purposes of illustrating a clear example, FIG. 4 may be described with reference to FIG. 1 and the following structure, but neither the particular arrangement illustrated in FIG. 1 nor the following structure are required in other embodiments:

Universal schema 124 defines a universal database named "Store Customers" with the following attributes:
  a first table named "Customer Info",
  a first column in the first table named "Customer Number",
  a second column in the first table named "Customer Name",
  an identifier that identifies specialized data store 172 as the specialized data store for the first table, "172",
  an identifier that identifies plug-in 132 as the plug-in to use for queries to the first table, "132",
  a second table named "Customer Photos",
  a first column in the second table named "Customer Number",
  a second column in the second table named "Photo",
  an identifier that identifies specialized data store 174 as the specialized data store for the second table, "174",
  an identifier that identifies plug-in 134 as the plug-in to use for queries to the second table, "134".

Specialized data store 172 maintains a type of SQL-based databases optimized to store and retrieve small key-value pairs.

Specialized data store 172 includes a table in a database that corresponds to the table in the universal database named "Customer Info"; the table includes a record with a customer number and a customer name, "54321" and "Bob", respectively.

Specialized data store 174 maintains a type of file system optimized to store and retrieve large files.

Specialized data store 174 includes a directory that corresponds to the table in the universal database named "Customer Photos"; the directory includes a file that is a photo and is named "54321.png".

In step 405, a universal data store receives a request with parameters based on a universal schema from a client computer to join results from two tables, each with data stored in a different specialized data store. For example, universal data store 110 may receive request from a user using client computer 192 with the following parameters:
  the name of the column in the first table to join, "Customer Name",
  the name of the column in the second table to join, "Customer Photo", the name of the column on which to join the results from the first table and the results from the second table, "Customer Number", and the customer number to match in both the first table and the second table, "54321".

In step 410, the universal data store transforms the universal request to produce a first specialized query for the first data store using a first plug-in identified in the universal schema. For example, transformer 150, using plug-in 132, which is associated with the first table in universal schema 124, may transform the request into a first specialized query to be executed by specialized data store 172. The first specialized query may request both the customer number and the customer name where the customer number matches "54321".

In step 415, the universal data store transforms the request to produce a second specialized query for the second data store using a second plug-in identified in the universal schema. For example, transformer 150, using plug-in 134, which is associated with the second table in universal schema 124, may transform the request into a second specialized query to be executed by specialized data store 174. The second specialized query may request both the customer number and the customer photo where the customer number matches "54321".

In step 420, the universal data store sends the first specialized query to the first specialized data store and the second specialized query to the second specialized data store. For example, transformer 150 may send the first specialized query to specialized data store 172. Transformer 150 may send the second specialized query to the specialized data store 174.

In step 430, the universal data store receives a first specialized result from the first specialized data store and a second specialized result from the second specialized data store. For example, specialized data store 172 and specialized data store 174 may execute the specialized queries sent in step 420, respectively. Accordingly, specialized data store 172 may send the first specialized results to transformer 150, which include a customer number and a customer name: "54321" and "Bob". Specialized data store 174 may send the specialized results to transformer 150, which include the photo named "54321.png". Accordingly, transformer 150 receives both the first specialized result and the second specialized result.

In an embodiment, universal schemas may specify that one or more columns in one or more tables are indexed. Accordingly, specialized databases may have one or more columns in one or tables that are indexed. For example, transformer 150 may use plug-in 132 to generate a specialized query for specialized data store 172 to index data in the column that corresponds to the "Customer Number" column in the universal database. If a universal database stores data in a specialized database that is a file system, indexed columns in the universal database may correspond to directories, sub-directories, and file names; the data in columns in the universal database that are not indexed may be stored in a file.

In step 440, the universal data store transforms the first specialized result into a first universal result and the second specialized result into a second universal result. For example, transformer 150 may transform the first specialized result into a first universal result using one or more of the methods discussed above. Transformer 150 may transform the second specialized result into a second universal result using one or more of the methods discussed above. The image in the second universal result may be a textual representation of the binary data that comprises "54321.png" encoded into JSON format. Additionally or alternatively, the second universal result may include data that represents image "54321.png" in a Portable Pixel Map format, either in binary or plain text.

In step 450, the universal data store joins the first universal result and the second universal result. For example, transformer 150 may join the first universal result and the second universal result, generated in step 440, into a combined universal result in JSON format based on the customer identifier "54321" to produce a joined, universal result.

In step 460, the universal data store sends the joined, universal result to the remote client computer. For example, universal data store 110 sends the joined, universal result in step 450 to client computer 192 over HTTP.

4.3 Performing Customized Triggers on Universal Results

Figure 5:
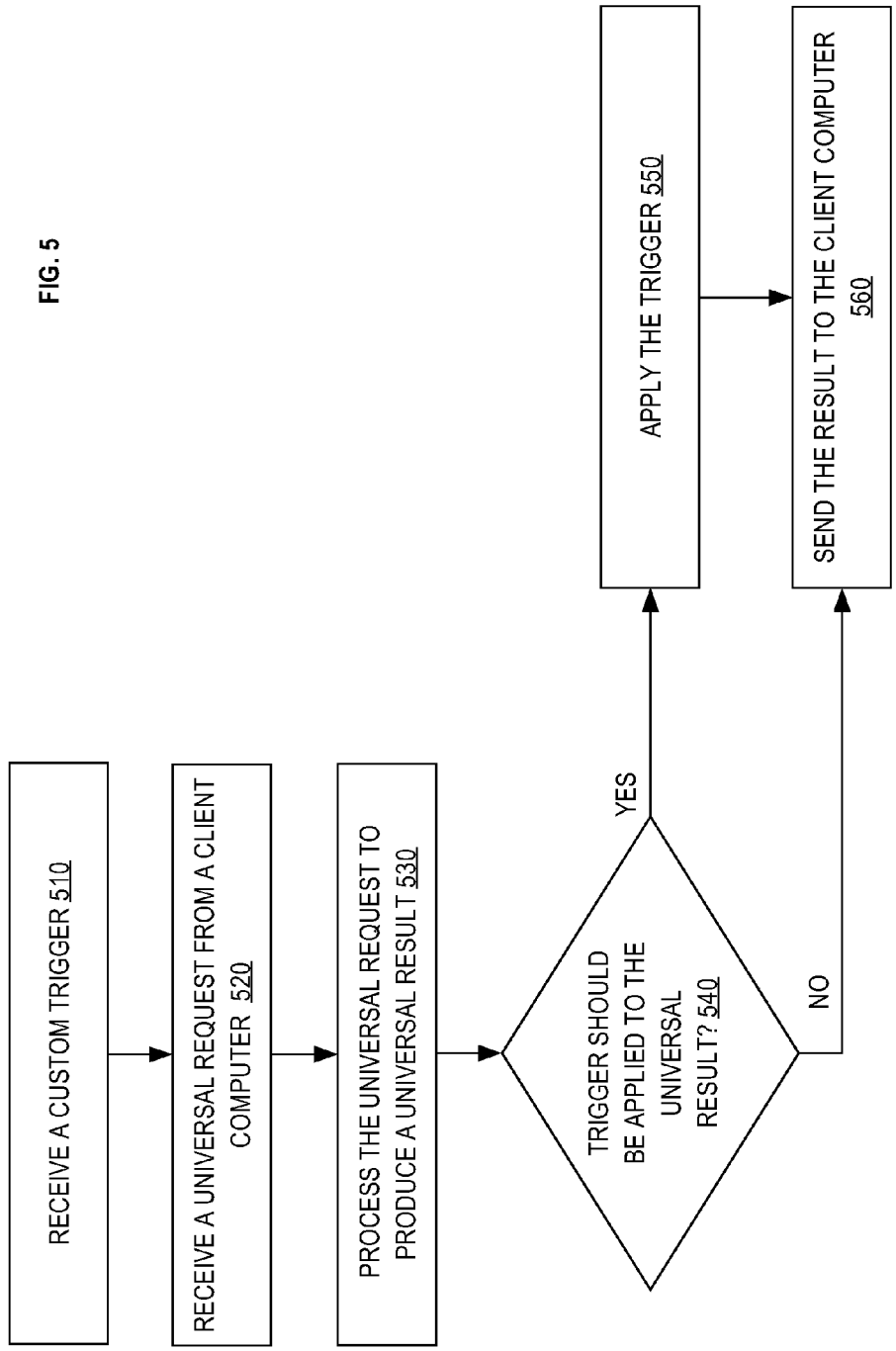
FIG. 5 illustrates a process for uploading a custom trigger and transforming a universal result using the custom trigger, in an example embodiment.

FIG. 5 illustrates a process for uploading a custom trigger and transforming a universal result using the custom trigger, in an example embodiment. For purposes of illustrating a clear example, FIG. 5 may be described with reference to FIG. 1, but using the particular arrangement illustrated in FIG. 1 is not required in other embodiments. Turning now to FIG. 5, in step 510, a universal data store receives a custom trigger. For example, universal data store 110 may receive a request that includes trigger 142 from a user using client computer 192. Accordingly, universal data store 110 may store trigger 142 in trigger repository 140. For purposes of illustrating a clear example, assume that:

Trigger 142 is a script that converts JSON into a proprietary XML format.

Trigger 142 references universal schema 124.

Trigger 142 specifies that if a universal request includes the parameter "XML", then trigger 142 is should be applied to the universal result.

In step 520, the universal data store receives a universal request from a client computer. For purposes of illustrating a clear example, assume universal data store 110 receives a universal request based on universal schema 124 and that the universal request includes the parameter "XML".

In step 530, the universal data store processes the universal request to produce a universal result. For example, universal data store 110 may processes the universal request according to one or more of the methods discussed above, which produces a universal result in JSON format.

In step 540, the universal data store determines whether a trigger should be applied to the universal result. If so, then control proceeds to step 550. Otherwise, control proceeds to step 560. In the current example, after generating the universal result, transformer 150 may determine that the universal request was based on universal schema 124 and that the universal request includes the parameter "XML". According, control proceeds to step 550.

In step 550, the universal data store applies the trigger. For example, transformer 150 executes trigger 142 and transforms the universal result format from JSON into the proprietary XML format.

In step 560, the universal data store sends the universal result to the client computer. For example, universal data store 110 sends the universal result to client computer 192.

For purposes of illustrating another example, assume the following facts:

Universal schema 122 defines a universal database that stores data in specialized data store 172;

Trigger 142 specifies a condition: if a universal request to store data in the universal database defined by universal schema 122 is received, then the data should also be replicated in specialized data store 174.

Accordingly, in response to receiving a universal request to store data in the universal database defined by universal schema 122, transformer 150 may execute trigger 142, causing the data in the universal request to be replicated in specialized data store 174.

Transformer 150 need not immediately execute trigger 142. Instead, transformer 150 may store a job in a job queue. The job may comprise the universal results to be replicated and a reference to trigger 142. Transformer 150 may perform the job when the job reaches the top of the job queue and/or transformer 150 is not otherwise busy performing other transformations.

The job queue may be a priority queue that orders jobs based on an assigned priority. In the current example, trigger 142 replicates data, which may not be a critical operation necessitating a high priority. Accordingly, trigger 142 may include data that specifies a lower priority, and a job that references trigger 142 may be assigned the lower priority. Additionally or alternatively, a universal request may include a priority. Accordingly, a job that is created in response to a universal request may be assigned the priority indicated in the universal request.

Transformer 150 may enqueue one or more universal requests into the job queue. Additionally, each request enqueued in the job queue may be assigned a priority. Additionally or alternatively, transformer 150 may maintain a separate job queue for universal requests that is separate from the job queue for triggers.

Steps similar to the steps illustrated in FIG. 5 may be used for built-in triggers. For example, instead of universal data store 110 receiving a custom trigger, in step 510, universal data store 110 may receive a request to execute a built-in trigger stored in trigger repository 140 upon one or more specified conditions. In response to a universal request that satisfies the conditions, universal data store 110 may perform step 520 through step 560 as discussed above using the built-in trigger.

4.4 Copying Data from One Data Store to Another

Figure 6:
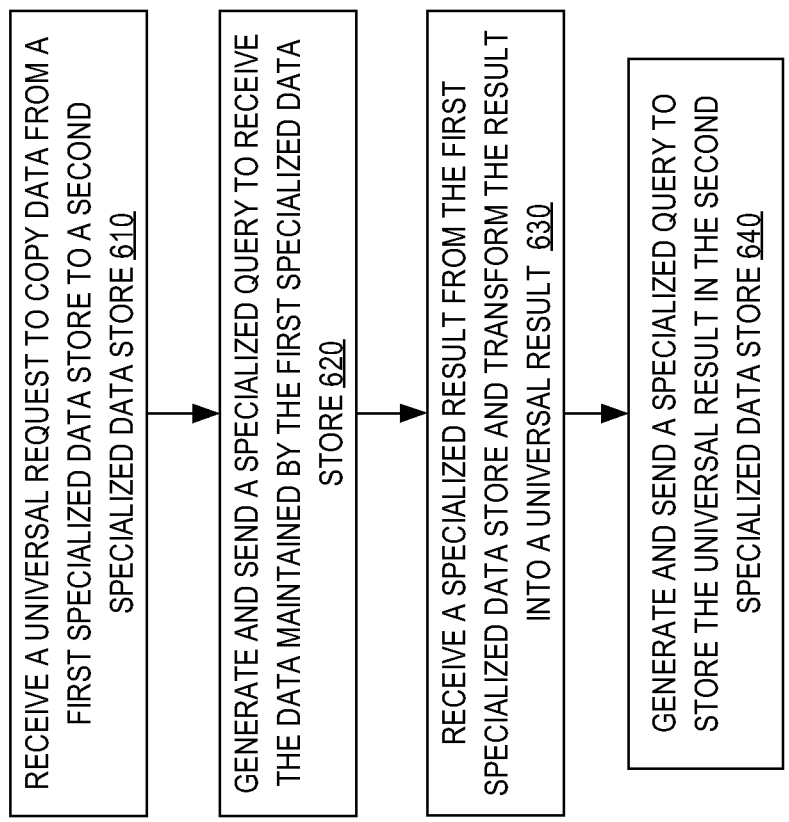
FIG. 6 illustrates a process for copying data from a first specialized data store to a second specialized data store, maintains databases that are a different type than the databases maintained by the first specialized data store, in an example embodiment.

A universal data store may support copying data from a specialized database in a first data store to another database in a different data store. FIG. 6 illustrates a process for copying data from a first specialized data store to a second specialized data store, maintains databases that are a different type than the databases maintained by the first specialized data store, in an example embodiment. For purposes of illustrating a clear example, FIG. 6 may be described with reference to FIG. 1 and the following structure and operations, but neither the particular arrangement illustrated in FIG. 1 nor the following structure or operations are required in other embodiments:

Universal schema 122 describes a universal database with data stored in a specialized database maintained by specialized data store 172;

Specialized data store 174 maintains databases that are a different type of database than the databases maintained by specialized data store 172.

Plug-in 132 is a plug-in for the same type of databases maintained by specialized data store 172;

Plug-in 134 is a plug-in for the same type of databases maintained by specialized data store 174;

Turning now to FIG. 6, in step 610, a universal data store receives a universal request to copy data from a first specialized data store to a second specialized data store. For example, universal data store 110 may receive a universal request to copy the data form the universal database described by universal schema 122 into a database maintained by specialized data store 174.

In step 620, the transformer generates and sends a specialized query to receive the data maintained by the first specialized data store. For example, transformer 150, using plug-in 132, may generate a specialized query to retrieve the data in the universal database that is maintained by specialized data store 172 using one or more of the methods discussed above.

In step 630, the transformer receives a specialized result from the first specialized data store and transforms the result into a universal result. For example, transformer 150 may receive the data requested in step 620, and transform the data into a universal result using plug-in 132 and one or more of the methods discussed above.

In step 640, the transformer generates and sends a specialized query to store the universal result in the second specialized data store. For example, transformer 150 may use one or more of the methods discussed above to create a new database maintained by specialized data store 174 using plug-in 134, update universal schema 122, and/or generate universal schema 124. Transformer 150 may also use one or more of the methods discussed above to transform the universal request into a specialized query to store the universal result in the new database maintained by specialized data store 174.

For purposes of illustrating a clear example, the steps in FIG. 6 are illustrated as if all the data in a first database is retrieved from a first data store, before storing the data in a second database in a second data store. Alternatively, the data in the first database may be retrieved in segments. As each segment is retrieved, the transformer transforms and stores the segment in the second database maintained by the second data store incrementally. Accordingly, step 620 and step 630 may be executed, at least in part, in parallel.

For large databases, copying data from a first specialized database maintained by a first data store to a second database maintained by a second data store may take a considerable time. Meanwhile, requests to store new data in the first database be received and executed. Accordingly, using one or more of the methods discussed above, a trigger may be used to replicate new data stored in the first database to the second database in the second data store.

Steps similar to the steps illustrated in FIG. 6 may be used to copy data from a first database into a second database that is the same type of database as the first database. For example, using one or more of the methods discussed above, data from a first database may be stored in a second database maintained by the same data store. Additionally or alternatively, using one or more of the method discussed above, data from a first database maintained by a first data store may be stored in a second database maintained by a second data store, even if the first data store and the second data store maintain the same type of databases.

5.0 an Example Specialized Database and Universal Schema

Figure 7:
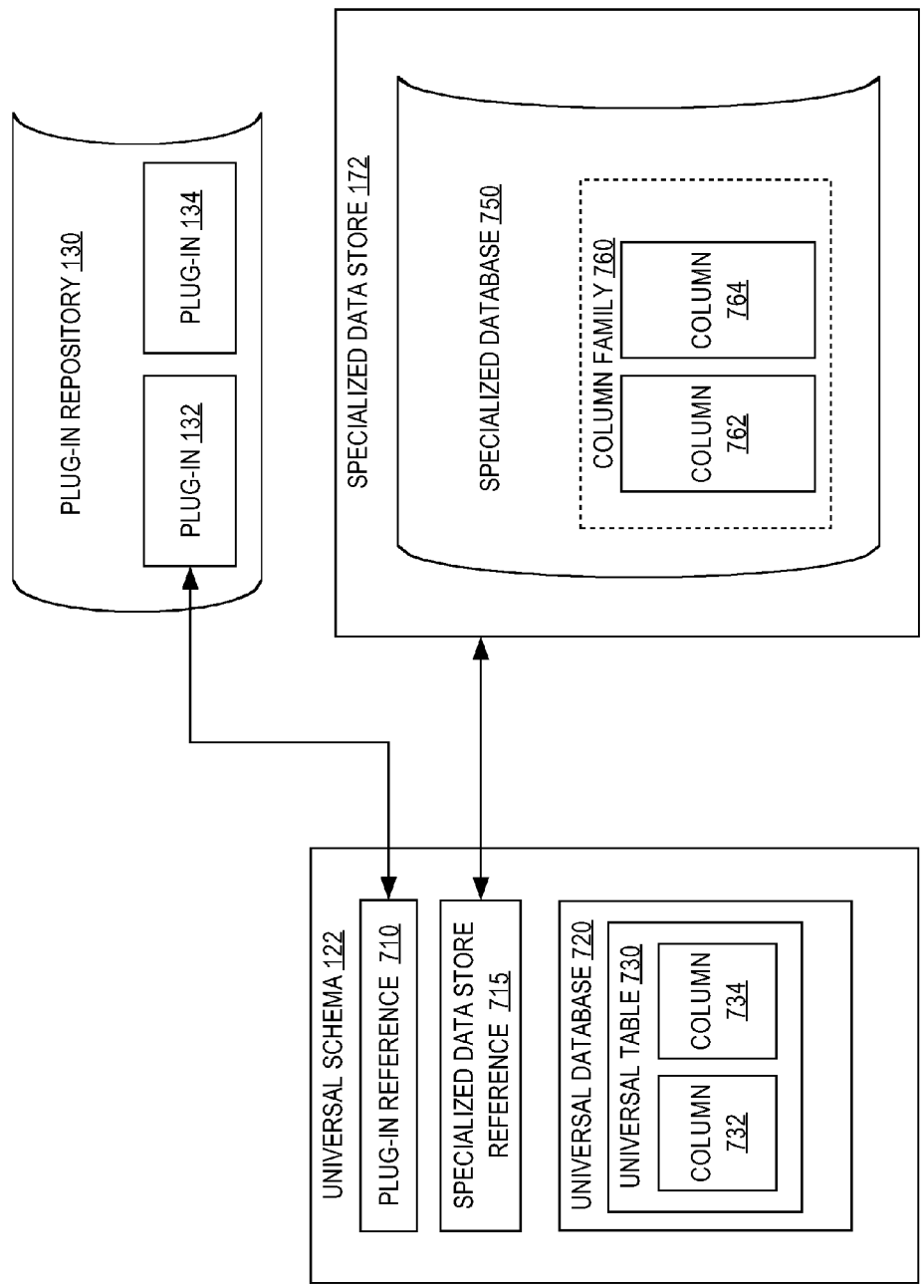
FIG. 7 illustrates a specialized database that maintains the data for a universal database and a universal schema that defines the universal database, in an example embodiment.

FIG. 7 illustrates a specialized database that maintains the data for a universal database and a universal schema that defines the universal database, in an example embodiment. For purposes of illustrating a clear example, FIG. 7 may be described with reference to FIG. 1, but the particular arrangement illustrated in FIG. 1 is not required in other embodiments. In FIG. 7, universal schema 122 may define universal database 720, which comprises a table: universal table 730. Universal schema 122 may define universal table 730 with two columns: column 732 and column 734. Accordingly, a universal request may request data to be stored and/or retrieved based on universal database 720, and specifically universal table 730.

Universal schema 122 may reference each specialized data store used to maintain the data for universal database 720. For purposes of illustrating a clear example, assume that specialized data store 172 maintains the data for universal database 720. Accordingly, universal schema 122 may maintain a reference to specialized data store 172: specialized data store reference 715.

Specialized data store 172 may be a data store that maintains column-oriented databases. For example, specialized data store 172 may maintain specialized database 750, which may include column 762 and column 764. Specialized database 750 may define a column family that groups column 762 and column 764 together: column family 760, which may correspond to universal table 730 in universal database 720.

Universal schema 122 may reference each plug-in in plug-in repository 130 that transforms a universal request, based on universal schema 122 and/or universal database 720, into a specialized query to store and/or retrieve data in a specialized data store. For purposes of illustrating a clear example, assume plug-in 132 may transform universal requests into specialized queries for specialized data store 172. Accordingly, universal schema 122 may maintain a reference to plug-in 132: plug-in reference 710.

In an embodiment, using one or more of the methods discussed herein, in response to a universal request to create universal table 730 with column 732 and column 734, plug-in 132 may transform the universal request into a specialized query, which when executed by specialized data store 172, causes specialized data store 172 to create column 762 and column 764 in specialized database 750. The specialized query may also indicate that column 762 and column 764 are in the same column family: column family 760.

In an embodiment, using one or more of the methods discussed herein, in response to a universal request to retrieve data from universal table 730, based on values in column 732, plug-in 132 may transform the universal request into a specialized query. The specialized query, when executed by specialized data store 172, may cause specialized data store 172 to retrieve specialized results from column 762 and column 764, based on values in column 762. The retrieved specialized results may be based on the columns within column family 760: column 762 and column 764. Plug-in 132 may transform the specialized results based on column 762 and column 764 into universal results based on universal table 730, column 732, and column 734.

6.0 Additional Features and Benefits

In an embodiment, a user may use one or more of the methods discussed herein to store data in specialized databases that the user is not familiar with or would otherwise not know how to interface with. For example, a user may be familiar with SQL-based databases, but not non-SQL-based databases, or even a particular type of SQL-based databases. However, a user may specify in a universal request that the user wants to store data in a non-SQL-based database, using a plug-in that is already stored in the universal plug-in repository. Furthermore, the user may receive universal data regardless of the one or more specialized databases the requested data is stored in. Accordingly, a user may start using and taking advantage of a particular database in a particular data store without learning a proprietary query language or a different results format.

In an embodiment, a developer may use one or more of the methods discussed herein to write software that sends universal requests to, and receives universal results from, a universal data store, even though the data is maintained in more than one type of database in more than one specialized data store. In an embodiment, a developer may use uniform end points to perform one or more of the operations discussed herein on data maintained by more than one specialized data store. Accordingly, in an embodiment, even as the complexity of a developer's software grows, which may cause data to be maintained in more than one specialized data store, the developer need not be aware of the more than one specialized databases. Furthermore, in an embodiment, the application need not be programmed to interface directly with a specialized data store and/or specialized database. Accordingly, in an embodiment, using one or more of the methods discussed herein, a developer may create an application that leverages the benefits of more than one specialized database.

In an embodiment, using one or more of the methods discussed herein, a universal data store may perform a join of data maintained in two different specialized data stores without a requester being aware the data joined was stored in more than one specialized data store and/or specialized database. In an embodiment, the result of a join may cause a trigger to be executed without a requester being aware that the data joined was stored in more than one specialized data store and/or specialized database, because the trigger is performed on the joined universal result.

In an embodiment, a user may use one or more of the methods discussed above to copy data from a first specialized database to a second specialized database that is a different type of database than the first database. The user need not create complex proprietary software to copy data from the first specialized database to the second specialized database.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
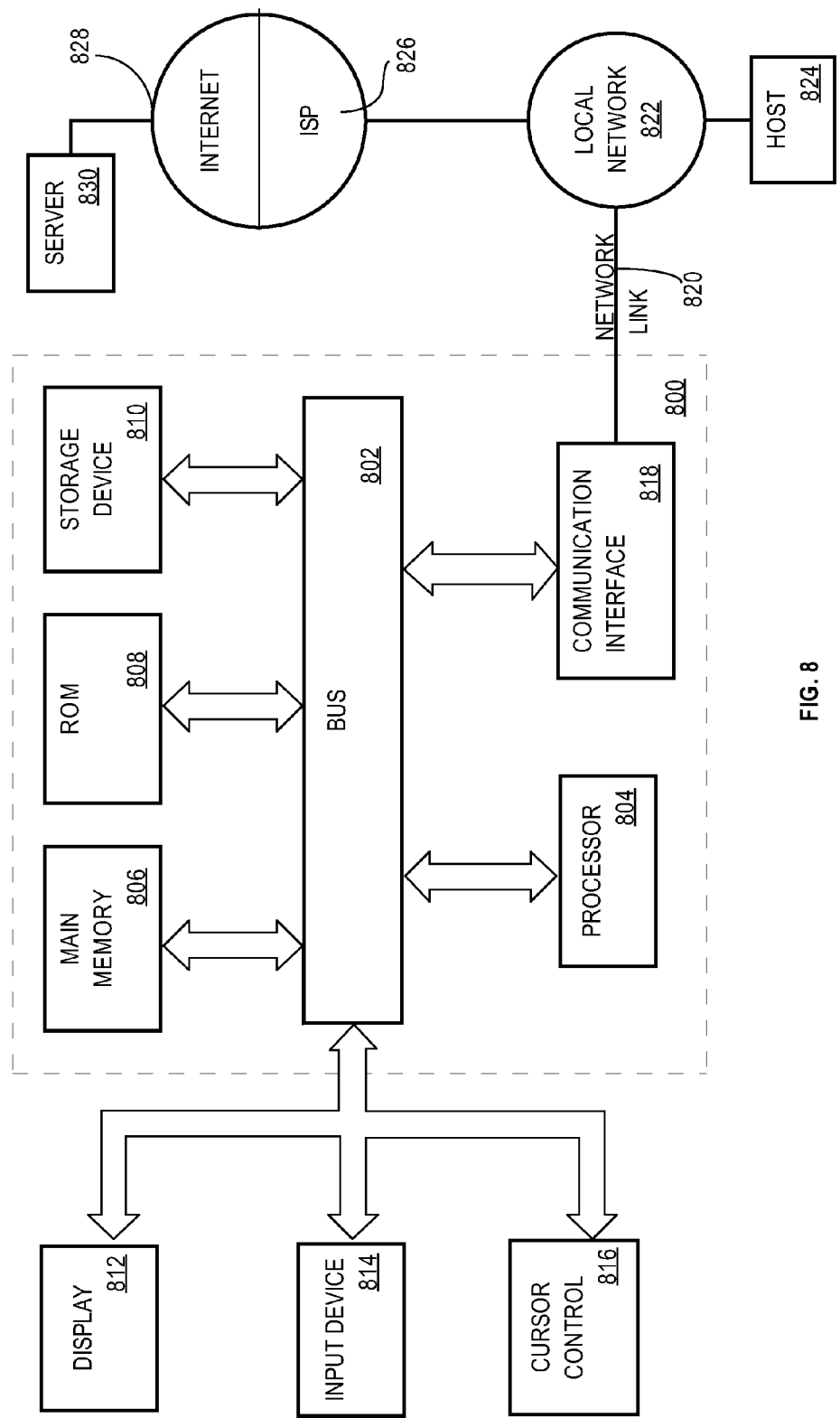
FIG. 8 illustrates a computer system upon which an embodiment may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of the subject matter described herein are set out in the following numbered clauses:

1. A method comprising: receiving a first input defining organization of one or more universal data elements; generating a first universal schema that defines organization of the one or more universal data elements based on the first input; associating the first universal schema with a first specialized plug-in, wherein the first specialized plug-in maps the one or more universal data elements into data elements a specialized database in a first specialized data store; receiving, from a first computer, a first request to receive data stored in the first specialized data store and comprising parameters based on the first universal schema; transforming the first request using the first specialized plug-in associated with the first universal schema to produce a specialized query; sending the specialized query to the first specialized data store to execute the specialized query; receiving a first specialized result set from the first specialized data store; sending, to the first computer, a result set based on specialized result set; wherein the method is performed by one or more second computers.

2. The method of clause 1 comprising: receiving the first request from the first computer in an HTTP request; sending the result set to the first computer using an HTTP response.

3. The method of clause 1-2, wherein the first request is a write request that includes a payload, and the method comprises storing the payload in the first specialized data store according to the first specialized plug-in.

4. The method of clause 1-3, wherein the first request is an update request that includes a payload, and the method comprises storing the payload in the first specialized data store according to the first specialized plug-in.

5. The method of clause 1-4, wherein the first request is a delete request, and the method comprises deleting data from the first specialized data store according to the first specialized plug-in.

6. The method of clause 1-5, wherein the first request is a read request, the first specialized data store includes a specialized schema that defines organization in the first specialized data store of one or more data elements that correspond to the one or more universal data elements, and the first specialized result set is formatted based the specialized schema, and the method comprises transforming the first specialized result set to produce the result set using the first specialized plug-in, wherein the result set is formatted based on the first universal schema.

7. The method of clause 1-6 comprising: receiving a second input defining how one or more second universal data elements are organized; generating a second universal schema that defines how the one or more second universal data elements are organized; associating the second universal schema with a second specialized plug-in, wherein the second specialized plug-in defines how the one or more universal data elements are organized in a second specialized data store; receiving a second request with parameters based on the first universal schema to receive data stored in the second specialized data store; transforming the second request using the second specialized plug-in associated with the second universal schema to produce a second specialized query; sending the second specialized query to the second specialized data store to execute the second specialized query; receiving a second specialized result set from the second specialized data store; transforming the second specialized result set to produce a second universal result set using the second specialized plug-in, wherein the second universal result set is formatted based on the second universal schema; sending the second universal result set to the remote client computer that the second request was received from.

8. The method of clause 1-7 comprising: receiving a second input defining how one or more second universal data elements are organized; generating a second universal schema that defines how the one or more second universal data elements are organized; associating the second universal schema with a second specialized plug-in, wherein the second specialized plug-in defines how the one or more universal data elements are organized in a second specialized data store; receiving the first request with parameters based on the first universal schema and the second universal schema to receive data stored in the first specialized data store and the second specialized data store; transforming the first request to produce a second specialized query using the second specialized plug-in; sending the second specialized query to the second specialized data store to execute the second specialized query; receiving a second specialized result set from the second specialized data store; transforming the first specialized result set to a first universal result set using the first specialized plug-in, wherein the first universal result set is formatted based on the first universal schema; transforming the second specialized result set to a second universal result set using the second specialized plug-in, wherein the second universal result set is formatted based on the second universal schema; joining the first specialized result set and the second specialized result set to produce the result set.

9. The method of clause 1-8 comprising: receiving second input defining one or more operations to perform on a universal result set if the first request includes a particular parameter; receiving the first request with the particular parameter; transforming the first specialized result set to the universal result set using the first specialized plug-in; performing the one or more operations on the universal result set to produce the result set.

10. The method of clause 1-9 comprising: receiving an instruction to replicate new data sent to the first specialized data store to a second specialized data store, wherein the first specialized data store and the second specialized data store are a same type of data store; determining that the first request is not a read request and in response sending the specialized query to the second specialized data store.

11. The method of clause 1-10 comprising: receiving an instruction to replicate new data sent to the first specialized data store to a second specialized data store, wherein the first specialized data store is a different type of data store than the second specialized data store, and in response: associating the first universal schema with a second specialized plug-in, wherein the second specialized plug-in defines how the one or more universal data elements are organized in the second specialized data store; determining that the first request is not a read request and in response: transforming the first request using the second specialized plug-in associated with the first universal schema to produce a second specialized query; sending the second specialized query to the second specialized data store to execute the second specialized query.

12. The method of cause 1-11 comprising: associating the first universal schema with a second specialized plug-in;

transforming the first request using the first specialized plug-in associated with the first universal schema to produce a first specialized query to retrieve a first set of results from the first specialized data store; wherein the first specialized query comprises one or more instructions that are compatible with the first specialized data store; transforming the first request using the second specialized plug-in associated with the first universal schema to produce a second specialized query to retrieve a second set of results from a second specialized data store; wherein the second specialized query comprises one or more instructions that are compatible with the second specialized data store; wherein the second specialized query is different than the first specialized query; receiving the first specialized result set from the first specialized data store based on the first specialized query; receiving a second specialized result set from the second specialized data store based on the second specialized query; transforming the first specialized result set to a first universal result set, wherein the first universal result set is based on the first universal schema; transforming the second specialized result set to a second universal result set, wherein the second universal result set is based on the first universal schema; joining the first universal result set and the second universal result set to produce the result set, which is a universal result set that is based on the first universal schema.

13. The method of clause 1-12 comprising associating the first universal schema with the first specialized plug-in, which defines one or more methods for transforming a universal request into one or more specialized queries that create, read, update, and delete one or more data items in the first specialized data store.

14. A method comprising: receiving an input defining organization of one or more universal data elements; generating a universal schema that defines organization of the one or more universal data elements based on the input; associating the universal schema with a first specialized plug-in, wherein the first specialized plug-in defines how the one or more universal data elements are organized in a first specialized data store; receiving a command to copy data in the first specialized data store to a second specialized data store; associating the universal schema with a second specialized plug-in, wherein the second specialized plug-in defines organization of the one or more universal data elements in the second specialized data store; generating a first request to receive a set of data from the first specialized data store; transforming the first request using the first specialized plug-in to produce a first specialized query; sending the first specialized query to the first specialized data store to execute the first specialized query; receiving a specialized result set from the first specialized data store; transforming the specialized result set using the first specialized plug-in to produce a universal result set, wherein the universal result set is formatted based on the universal schema; generating a second specialized query, using the second specialized plug-in, to store the universal result set in the second specialized data store; sending the second specialized query to the second specialized data store; wherein the method is performed by one or more second computers.

15. A non-transitory computer-readable data storage medium storing one or more sequences of instructions which when executed cause one or more processors to perform any of the methods recited in clauses 1-10.

16. A computer program product including instructions which, when implemented on one or more processors, carries out any of the methods recited in clauses 1-10.

17. A computing device having a processor configured to perform any of the methods recited in clauses 1-10.

What is claimed is:
1. A method comprising:
receiving a first input defining organization of one or more first universal data elements;
generating a first universal schema that defines how one or more first universal data elements are organized and includes a first specialized plug-in reference to a first specialized plug-in and a first specialized data store reference to a first specialized data store, wherein the first specialized plug-in defines how the one or more first universal data elements are organized in the first specialized data store;
receiving a second input defining how one or more second universal data elements are organized;
generating a second universal schema that defines how the one or more second universal data elements are organized and includes a second specialized plug-in reference to a second specialized plug-in and a second specialized data store reference to a second specialized data store, wherein the second specialized plug-in defines how the one or more second universal data elements are organized in the second specialized data store;
receiving, from a first computer, a first request directed to data in the first specialized data store and the second specialized data store, wherein the first request comprises one or more first parameters based on the first universal schema and one or more second parameters based on the second universal schema;
determining to use the first specialized plug-in based on the first specialized plug-in reference to the first specialized plug-in in the first universal schema;
determining the use the second specialized plug-in based on the second specialized plug-in reference to the second specialized plug-in in the second universal schema;
transforming the first request using the first specialized plug-in associated with the first universal schema to produce a first specialized query based on the one or more first parameters and the first universal schema;
transforming the first request using the second specialized plug-in associated with the second universal schema to produce a second specialized query based on the one or more second parameters and the second universal schema;
sending the first specialized query to the first specialized data store to execute the first specialized query in response to determining that the first universal schema includes the first specialized data store reference to the first specialized data store;
sending the second specialized query to the second specialized data store to execute the second specialized query in response to determining that the second universal schema includes the second specialized data store reference to the first specialized data store;
receiving a first specialized result set from the first specialized data store;
receiving a second specialized result set for the second specialized data store;
sending, to the first computer, a result set based on the first specialized result set and the second specialized result set;
wherein the method is performed by one or more computers.

2. The method of claim 1 comprising:
receiving the first request from the first computer in an HyperText Transfer Protocol ("HTTP") request;

sending the result set to the first computer using an HTTP response.

3. The method of claim 1, wherein the first request is a write request that includes a payload, and the method comprises storing the payload in the first specialized data store according to the first specialized plug-in.

4. The method of claim 1, wherein the first request is an update request that includes a payload, and the method comprises storing the payload in the first specialized data store according to the first specialized plug-in.

5. The method of claim 1, wherein the first request is a delete request, and the method comprises deleting data from the first specialized data store according to the first specialized plug-in.

6. The method of claim 1, wherein the first request is a read request, the first specialized data store includes a specialized schema that defines organization, in the first specialized data store, of one or more data elements that correspond to the one or more first universal data elements, and the first specialized result set is formatted based on the specialized schema, and the method comprises transforming the first specialized result set to produce a first universal result set using the first specialized plug-in, wherein at least a first portion of the result set comprises data from the first universal result set and is formatted based on the first universal schema.

7. The method of claim 6 comprising:
transforming the second specialized result set to produce a second universal result set using the second specialized plug-in, wherein at least a second portion of the result set comprises data from the second universal result set and is formatted based on the second universal schema.

8. The method of claim 1 comprising:
joining the first specialized result set and the second specialized result set to produce the result set.

9. The method of claim 1 comprising:
receiving input defining one or more operations to perform on a universal result set if a request includes a particular parameter;
determining that the first request includes the particular parameter;
in response to determining that the first request includes the particular parameter, performing the one or more operations on the universal result set to produce the result set.

10. The method of claim 1 comprising:
receiving an instruction to replicate new data sent to the first specialized data store to a third specialized data store, wherein the first specialized data store and the third specialized data store are a same type of data store;
determining that the first request is not a read request and in response sending the first specialized query to the third specialized data store.

11. The method of claim 1 comprising:
receiving an instruction to replicate new data sent to the first specialized data store to a third specialized data store, wherein the first specialized data store is a different type of data store than the third specialized data store, and in response:
associating the first universal schema with a third specialized plug-in, wherein the third specialized plug-in defines how one or more third universal data elements are organized in the third specialized data store;
determining that the first request is not a read request and in response:
transforming the first request using the third specialized plug-in associated with the first universal schema to produce a third specialized query;
sending the third specialized query to the third specialized data store to execute the third specialized query.

12. The method of claim 1 comprising:
associating the first universal schema with a third specialized plug-in;
transforming the first request using the third specialized plug-in associated with the first universal schema to produce a third specialized query to retrieve a third set of results from a third specialized data store;
wherein the third specialized query comprises one or more instructions that are compatible with the third specialized data store;
wherein the third specialized query is different than the first specialized query;
receiving a third specialized result set from the third specialized data store based on the third specialized query;
transforming the first specialized result set to a first universal result set, wherein the first universal result set is based on the first universal schema;
transforming the third specialized result set to a third universal result set, wherein the third universal result set is based on the first universal schema;
joining the first universal result set and the third universal result set to produce the result set, which is a universal result set that is based on the first universal schema.

13. The method of claim 1, wherein the first specialized plug-in defines one or more methods for transforming a universal request into one or more specialized queries that create, read, update, and delete one or more data items in the first specialized data store.

14. One or more non-transitory computer-readable media storing one or more sequences of instructions which, when executed by one or more computing devices, cause:
receiving a first input defining organization of one or more first universal data elements;
generating a first universal schema that defines how one or more first universal data elements are organized and includes a first specialized plug-in reference to a first specialized plug-in and a first specialized data store reference to a first specialized data store, wherein the first specialized plug-in defines how the one or more first universal data elements are organized in the first specialized data store;
receiving a second input defining how one or more second universal data elements are organized;
generating a second universal schema that defines how the one or more second universal data elements are organized and includes a second specialized plug-in reference to a second specialized plug-in and a second specialized data store reference to a second specialized data store, wherein the second specialized plug-in defines how the one or more second universal data elements are organized in the second specialized data store;
receiving, from a first computer, a first request directed to data in the first specialized data store and the second specialized data store, wherein the first request comprises one or more first parameters based on the first universal schema and one or more second parameters based on the second universal schema;
determining to use the first specialized plug-in based on the first specialized plug-in reference to the first specialized plug-in in the first universal schema;

determining the use the second specialized plug-in based on the second specialized plug-in reference to the second specialized plug-in in the second universal schema;

transforming the first request using the first specialized plug-in associated with the first universal schema to produce a first specialized query based on the one or more first parameters and the first universal schema;

transforming the first request using the second specialized plug-in associated with the second universal schema to produce a second specialized query based on the one or more second parameters and the second universal schema;

sending the first specialized query to the first specialized data store to execute the first specialized query in response to determining that the first universal schema includes the first specialized data store reference to the first specialized data store;

sending the second specialized query to the second specialized data store to execute the second specialized query in response to determining that the second universal schema includes the second specialized data store reference to the first specialized data store;

receiving a first specialized result set from the first specialized data store;

receiving a second specialized result set for the second specialized data store;

sending, to the first computer, a result set based on the first specialized result set and the second specialized result set.

15. The one or more non-transitory computer-readable media of claim 14 comprising sequences of instructions which when executed cause:
receiving the first request from the first computer in an HyperText Transfer Protocol ("HTTP") request;
sending the result set to the first computer using an HTTP response.

16. The one or more non-transitory computer-readable media of claim 14, wherein the first request is a write request that includes a payload, and comprising sequences of instructions which when executed cause storing the payload in the first specialized data store according to the first specialized plug-in.

17. The one or more non-transitory computer-readable media of claim 14, wherein the first request is an update request that includes a payload, and comprising sequences of instructions which when executed cause storing the payload in the first specialized data store according to the first specialized plug-in.

18. The one or more non-transitory computer-readable media of claim 14, wherein the first request is a delete request, and comprising sequences of instructions which when executed cause deleting data from the first specialized data store according to the first specialized plug-in.

19. The one or more non-transitory computer-readable media of claim 14, wherein the first request is a read request, the first specialized data store includes a specialized schema that defines organization, in the first specialized data store, of one or more data elements that correspond to the one or more first universal data elements, and the first specialized result set is formatted based on the specialized schema, and comprising sequences of instructions which when executed cause transforming the first specialized result set to produce a first universal result set using the first specialized plug-in, wherein at least a first portion of the result set comprises data from the first universal result set and is formatted based on the first universal schema.

20. The one or more non-transitory computer-readable media of claim 19 comprising sequences of instructions which when executed cause:
transforming the second specialized result set to produce a second universal result set using the second specialized plug-in, wherein at least a second portion of the result set comprises data from the second universal result set and is formatted based on the second universal schema.

21. The one or more non-transitory computer-readable media of claim 14 comprising sequences of instructions which when executed cause:
joining the first specialized result set and the second specialized result set to produce the result set.

22. The one or more non-transitory computer-readable media of claim 14 comprising sequences of instructions which when executed cause:
receiving input defining one or more operations to perform on a universal result set if a request includes a particular parameter;
determining that the first request includes the particular parameter;
in response to determining that the first request includes the particular parameter, performing the one or more operations on the universal result set to produce the result set.

23. The one or more non-transitory computer-readable media of claim 14 comprising sequences of instructions which when executed cause:
receiving an instruction to replicate new data sent to the first specialized data store to a third specialized data store, wherein the first specialized data store and the third specialized data store are a same type of data store;
determining that the first request is not a read request and in response sending the first specialized query to the third specialized data store.

24. The one or more non-transitory computer-readable media of claim 14 comprising sequences of instructions which when executed cause:
receiving an instruction to replicate new data sent to the first specialized data store to a third specialized data store, wherein the first specialized data store is a different type of data store than the third specialized data store, and in response:
associating the first universal schema with a third specialized plug-in, wherein the third specialized plug-in defines how one or more third universal data elements are organized in the third specialized data store;
determining that the first request is not a read request and in response:
transforming the first request using the third specialized plug-in associated with the first universal schema to produce a third specialized query;
sending the third specialized query to the third specialized data store to execute the third specialized query.

25. The one or more non-transitory computer-readable media of claim 14 comprising sequences of instructions which when executed cause:
associating the first universal schema with a third specialized plug-in;
transforming the first request using the third specialized plug-in associated with the first universal schema to produce a third specialized query to retrieve a third set of results from a third specialized data store;

wherein the third specialized query comprises one or more instructions that are compatible with the third specialized data store;

wherein the third specialized query is different than the first specialized query;

receiving a third specialized result set from the third specialized data store based on the third specialized query;

transforming the first specialized result set to a first universal result set, wherein the first universal result set is based on the first universal schema;

transforming the third specialized result set to a third universal result set, wherein the third universal result set is based on the first universal schema;

joining the first universal result set and the third universal result set to produce the result set, which is a universal result set that is based on the first universal schema.

26. The one or more non-transitory computer-readable media of claim 14, wherein the first specialized plug-in defines one or more methods for transforming a universal request into one or more specialized queries that create, read, update, and delete one or more data items in the first specialized data store.

\* \* \* \* \*